(12) United States Patent
Geng et al.

(10) Patent No.: US 12,124,157 B1
(45) Date of Patent: Oct. 22, 2024

(54) CAMERA ASSEMBLE AND A SHOOTING DEVICE

(71) Applicant: Anhui Sharetronic Data Technology Co., Ltd., Hefei (CN)

(72) Inventors: Sihua Geng, Hefei (CN); Zhou Yi, Hefei (CN); Jianfei Liu, Hefei (CN)

(73) Assignee: Anhui Sharetronic Data Technology Co., Ltd., Hefei (CN)

( * ) Notice: Subject to any disclaimer, the term of this patent is extended or adjusted under 35 U.S.C. 154(b) by 0 days.

(21) Appl. No.: 18/626,245

(22) Filed: Apr. 3, 2024

(30) Foreign Application Priority Data

Jan. 19, 2024 (CN) .......................... 202410083526.4

(51) Int. Cl.
*G03B 17/56* (2021.01)
*G03B 30/00* (2021.01)

(52) U.S. Cl.
CPC .......... *G03B 17/561* (2013.01); *G03B 30/00* (2021.01); *G03B 2206/00* (2013.01)

(58) Field of Classification Search
None
See application file for complete search history.

(56) References Cited

U.S. PATENT DOCUMENTS

2010/0259373 A1 10/2010 Chang

FOREIGN PATENT DOCUMENTS

| CN | 1992858 | A | | 7/2007 | |
|---|---|---|---|---|---|
| CN | 102774441 | A | | 11/2012 | |
| CN | 102957864 | A | | 3/2013 | |
| CN | 104494723 | A | * | 4/2015 | .......... B62D 57/024 |
| CN | 105791730 | A | | 7/2016 | |
| CN | 107458491 | A | * | 12/2017 | |
| CN | 208498640 | U | * | 2/2019 | ............... A47L 1/02 |
| CN | 110650320 | A | | 1/2020 | |
| CN | 111523347 | A | | 8/2020 | |
| CN | 110104084 | B | * | 4/2021 | .......... B62D 57/024 |
| CN | 114275065 | A | * | 4/2022 | |
| CN | 219584337 | U | * | 8/2023 | |
| CN | 219821613 | U | * | 10/2023 | |
| CN | 220147321 | U | * | 12/2023 | |
| DE | 202004001059 | U1 | | 4/2004 | |
| JP | 2002320189 | A | | 10/2002 | |
| JP | 2004349993 | A | | 12/2004 | |
| JP | 2011087032 | A | | 4/2011 | |
| JP | 2012023479 | A | | 2/2012 | |
| KR | 20100071222 | A | | 6/2010 | |
| KR | 101052207 | B1 | | 7/2011 | |

* cited by examiner

*Primary Examiner* — Rodney E Fuller (57) ABSTRACT

A camera assemble and a shooting device conveniently installed on a glass curtain wall are provided. The camera assemble includes a standard frame shooting component that is configured to record real pictures in a part of an unit time in a preset time period, a jump frame shooting component that is configured to extract a number of frames, and record real pictures at a frame rate of N frames/s for a rest of the unit time, and a frame connecting component configured to coincide a frame picture at an end of the unit of time in the preset time period with a frame picture at an initial moment of a next adjacent unit time. The present disclosure is aimed to save storage space and extend data storage duration by recording real pictures at different frame rates in different situations.

4 Claims, 6 Drawing Sheets

CAMERA ASSEMBLE AND A SHOOTING DEVICE

CROSS REFERENCE TO RELATED APPLICATIONS

This application claims foreign priority of Chinese Patent Application No. 202410083526.4, filed on Jan. 19, 2024 in the China National Intellectual Property Administration, the disclosures of all of which are hereby incorporated by reference.

TECHNICAL FIELD

The present disclosure relates to the technical field of camera, in particular to a camera assemble and a shooting device.

BACKGROUND

As a monitoring device, the camera is widely used in all walks of life. For the camera on the glass curtain wall of the building, the situation around the building can be monitored, the range of monitoring angles is large and the things happening in the city can be recorded. In the event of an accident or safety incident around the building, the camera can be used as a recording device to record the video image of the event.

China Patent Publication No. CN214756588U discloses a camera with storage function, audio and video signal files can be displayed in real time on the display of external application equipment, and can also be stored in memory chips, which reduces the storage performance requirements of the camera for external application equipment, and thus enhances the versatility of the camera; the storage files in the memory chip can be read on any external application equipment, eliminating the need to transfer files between two external application devices, thus improving the convenience of camera usage.

However, the above technical scheme has the following shortcomings:
  even if the storage files in the memory chip can be read on any external application equipment, the video signal file of the camera still occupies a large amount of storage space, and the video length of the storage chip itself for storing data is still limited.

SUMMARY

Aiming at the problems existing in the background technology, the present disclosure proposes a camera assemble and a shooting device conveniently installed on a glass curtain wall which saves storage space and extend data storage duration by recording real pictures at different frame rates in different situations.

On the one hand, the present disclosure proposes a camera assemble that is conveniently installed on a glass curtain wall, including a camera component, a communicating and transmitting component, a memory and a height and orientation controlling component.

The camera component includes a standard frame shooting component that is configured to record real pictures in a part of an unit time in a preset time period according to a preset standard frame rate of M frames/s, a jump frame shooting component that is configured to extract a number of frames from M frames at a frame rate M frames/s, and record real pictures at a frame rate of N frames/s for a rest of the unit time in the preset time period, and a frame connecting component that is communicated with the standard frame shooting component and the jump frame shooting component and is configured to coincide a frame picture at an end of the unit of time in the preset time period with a frame picture at an initial moment of a next adjacent unit time, and a continuous frame regeneration component that is communicated with the frame connecting component and is configured to select and retain a overlapped frame within a preset time period for regeneration into a continuous frame video, and a video output component that is communicated with the continuous frame regeneration component and is configured to output video data within the preset time period; where M and N are positive integers, and N<M, a shooting necessity at the frame rate of N frames/s of the jump shooting component is lower than a shooting necessity at the frame rate of M frames/s of the standard frame shooting component.

The communicating and transmitting component is communicated with the video output component, which is configured to transmit the video data.

The memory is wirelessly communicated with the communicating and transmitting component, which is configured to receive and store the video data.

The height and orientation controlling component is configured to control a height of the camera component and an orientation for shooting.

In an embodiment, the memory is set as asscrolling storage: to store new video data and delete overdue video data with a storage period of three months.

In an embodiment, when the preset time period is one day, under a 24-hour timing method, a shooting necessity from 0 o'clock to 7 o'clock is lower than a shooting necessity from 7 o'clock to 24 o'clock, and the jumping frame shooting component captures real pictures from 0 o'clock to 7 o'clock at a frame rate of N frames/s, and the standard frame shooting component captures real pictures at a frame rate of M frames/s from 7 o'clock to 24 o'clock.

In an embodiment, the camera assemble also includes a real environment dynamic degree monitoring component, a dynamic degree comparing component, and a frame rate setting component;
  the real environment dynamic degree monitoring component is configured to identify people and vehicles, and monitor the average moving velocity of people and vehicles in a preset monitoring period, and the average moving speed is taken as the dynamic degree;
  the dynamic degree comparing component is configured to compare a dynamic degree with a preset standard threshold, and the shooting necessity of the dynamic degree does not exceed the preset standard threshold is lower than that of the dynamic degree exceeds the preset standard threshold; when the dynamic degree exceeds the preset standard threshold, signals recorded according to an A-frame rate mode is sent to the jumping frame shooting component by the frame rate setting component, and the real pictures at the frame rate of M frames/s are recorded through the standard frame shooting component; when the dynamic degree does not exceed the preset standard threshold, the frame rate setting component sends the signals to the jumping frame shooting component recorded in a B-frame rate mode, and the real pictures at the frame rate of N frame/s are recorded through the jumping frame shooting component.

In an embodiment, monitoring objects and the preset standard thresholds of the real environment dynamic degree monitoring component are divided into following three situations:
- a, when the real environment dynamic degree monitoring component monitors the people: the preset standard threshold is 5 km/h, and the average moving speed of the person during the monitoring period is monitored and preseted by the real environment dynamic degree monitoring component;
- b, when non-motor vehicles and non-motor vehicle drivers are monitored by the real environment dynamic degree monitoring component: the preset standard threshold is 25 km/h, and presets the average moving speed of non-motor vehicles during the monitoring period is monitored by the real environment dynamic degree monitoring component;
- c, when motor vehicles is monitored by the real environment dynamic degree monitoring component: the preset standard threshold is 50 km/h, and the average moving speed of motor vehicles during the monitoring period is monitored and preseted by the real environment dynamic degree monitoring component monitors and;

when the dynamic degree of the monitoring objects in at least one of the above three situations exceeds the preset standard threshold in a corresponding situation, the signals recorded according to the A-frame rate mode are sent from the frame rate setting component to the jumping frame shooting component, and the real pictures at the frame rate of M frames/s are recorded through the standard frame shooting component;

when none of the three situations occur that the dynamic degree of the monitoring object exceeds the preset standard threshold in the corresponding situation, the signals recorded in B-frame rate mode are sent from the frame rate setting component to the jumping frame shooting component, and the real pictures at N frames/s frame rate are recorded through the jumping frame shooting component.

In an embodiment, the camera component includes a first camera a (1) and two second cameras b (2) symmetrically distributed on both sides of the first camera a (1), the first camera a (1) and the second camera b (2) are integrated with the standard frame shooting component, the jumping frame shooting component, the frame connecting component, the continuous frame regeneration components and the video output component.

In an embodiment, the height and orientation controlling component includes a height control mechanism which is configured to control the height of the camera component, to control the camera component to raise and lower on a glass curtain wall, and an orientation controlling mechanism which is configured to control the orientation of the camera component.

On the other hand, the present disclosure proposes a shooting device, including a camera assemble conveniently installed on the glass curtain wall, a signal transmitter electrically connected with a height and orientation controlling component and a controller connected with the signal transmitter.

Compared with the prior art, the present disclosure has the following beneficial technical effects:

The present disclosure is configured to record the real pictures at different frame rates in different situations, saving storage space and extend data storage duration and improving storage space utilization. when a shooting necessity is high, the real pictures at the frame rate of M frames/s are recorded, when a shooting necessity is low, the real pictures at the lower frame rate of N frames/s are recorded. In the case of the storage space of the memory determined, the total duration of the video data that the memory is configured to store is longer, that is, the video data is stored for a longer time, and the storage space utilization of the memory is higher. For the video generated at the frame rate of M frames/s, the fluency is higher, and what is happening around the glass curtain wall of the building is more clearly shown.

The appended drawing reference signs: 1, a first camera a; 2, a second camera b; 3, a rotating shaft; 4, a driven gear; 5, a driving gear; 6, a motor; 7, a camera channel; 8, a rotating frame; 9, a motor; 10, a mounting pad; 11, a body; 12, a synchronous pulley; 121, servo motor, 13, a synchronous belt; 14, a suction cup; 15, a connecting pipe; 16, a holding rod; 17, a piston; 18, a connecting rod; 19, a rotating plate; 20, a roller; 21, a guiding ring; 211, a straight bar section a; 212, a arc-shape bar section; 213, a straight bar section b; 214, a connecting bar section; 215, a straight bar section c

DETAILED DESCRIPTION OF THE EMBODIMENTS

Figure 1:
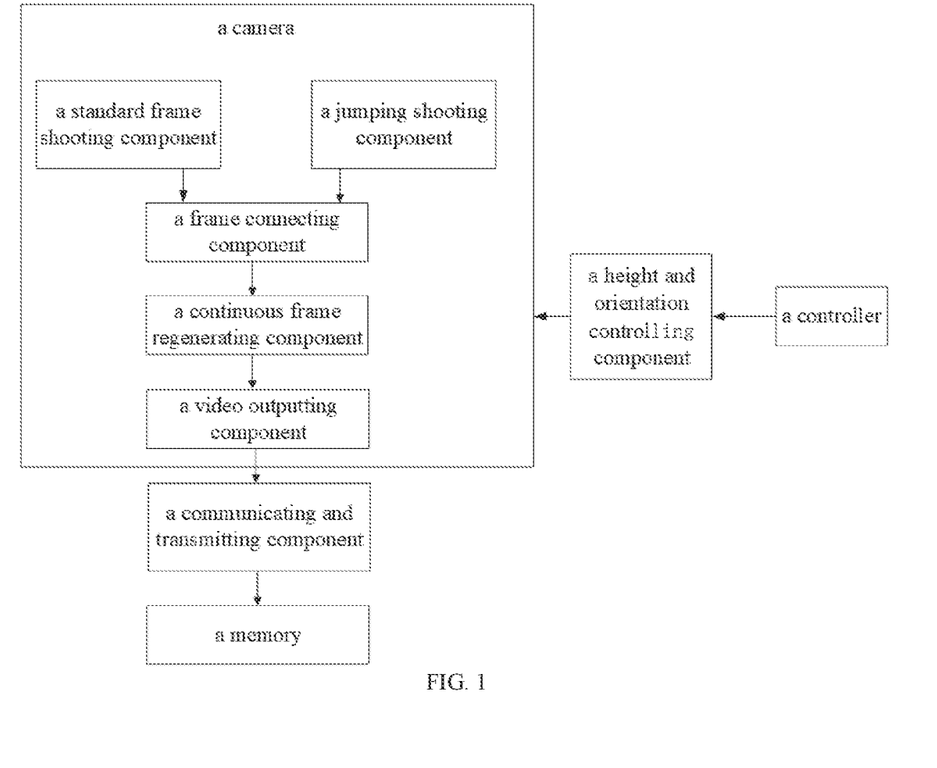
FIG. 1 is a schematic diagram of the system structure of an embodiment of the present disclosure.

The Embodiment 1, as shown in FIG. 1-FIG. 4, an embodiment of the present disclosure proposes a camera assemble that is conveniently installed on a glass curtain wall, including a camera, a communicating and transmitting component, a memory and a height and orientation controlling component.

the camera includes:
- the standard frame shooting component which is configured to record real pictures in a part of an unit time in a preset time period according to a preset standard frame rate of M frames/s, and
- the jump shooting component which is configured to extract a number of frames from M frames at a frame rate M frames/s, and record real pictures at a frame rate of N frames/s for a rest of the unit time in the preset time period, and
- the camera also includes a frame connecting component which is configured to coincide a frame picture at an end of the unit of time in the preset time period with a frame picture at an initial moment of a next adjacent unit time, where, the frame connecting component is communicated with the standard frame shooting component and the jump frame shooting component, where, the continuous frame regeneration component is communicated with the frame connecting component, where, the continuous frame regeneration component is configured to select and retain a overlapped frame within a preset time period for regeneration into a continuous frame video, and where, the video output component is communicated with the continuous frame regeneration component, and the video output component is configured to output video data within the preset time period;

where M and N are positive integers, and N<M, a shooting necessity at the frame rate of N frames/s of the jump shooting component is lower than a shooting necessity at the frame rate of M frames/s of the standard frame shooting component.

Figure 3:
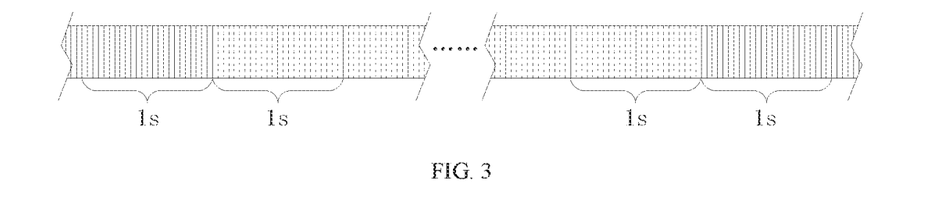
FIG. 3 is a schematic diagram of frame to frame connection under different unit time in a preset time period.

In practice, M can be selected as 25, 26, 27, 28, 29, or 30 or other higher frame rate values, N can be selected as 2, 3, 4, 5 or 6 or other lower frame rate values, the video picture recorded at the frame rate of M frames/s is smoother, the video picture recorded at the frame rate of N frames/s is relatively unsmooth, but still can roughly record the real pictures of the scene to a certain extent, and the video data still plays an important role. In FIG. 3, the vertical solid lines indicate the frame where the real pictures can be recorded, the vertical dotted lines indicate the skipped frame, the skipped frame cannot record the real pictures, and the example in FIG. 3 shows: M=25, N=3.

The unit time can be Is, and when the frame connecting component processes the frame pictures recorded through the standard frame shooting component and the jumping frame shooting component, it is divided into the following four situations:

1, the real pictures are recorded by the standard frame shooting component within two adjacent units of time (i.e., within two adjacent seconds), the frame connecting component coincides a frame picture recorded at the end of the first and the beginning of the second of two adjacent seconds, and the end of the first second is the same moment as the beginning of the second;

2, the real pictures are recorded by the jumping frame shooting component within two adjacent units of time (i.e., within two adjacent seconds), and the frame connecting component coincides a frame picture recorded at the end of the first and the beginning of the second of two adjacent seconds;

3, the real pictures are recorded by the standard frame shooting component within a unit of time (i.e., within one second), the real pictures are recorded by the jumping frame shooting component within the next unit of time (i.e., within the next second), the frame connecting component coincides a frame picture recorded at the end of one second and the beginning of the next second, and the end of one second is the same moment as the beginning of the next second;

4, the real pictures are recorded by the jumping frame shooting component within a unit of time (i.e., within one second), the real pictures are recorded by the standard frame shooting component within the next unit of time (i.e., within the next second), the frame connecting component coincides a frame picture recorded at the end of one second and the beginning of the next second, and the end of one second is the same moment as the beginning of the next second;

As shown in FIG. 1, the communicating and transmitting component is communicated with the video output component, which is configured to transmit the continuous video data regenerated by the continuous frame regeneration components.

The memory is wirelessly communicated with the communicating and transmitting component, and the memory is configured to receive and store the video data and can store the video data for a longer time, and the utilization of the memory is higher. In this embodiment, the memory is a non-transitory computer readable storage media.

The height and orientation controlling component is configured to control a height of the camera component and an orientation for shooting, and adjust the angle of video data from camera components by controlling the height and orientation of the camera components, making use more flexible. The height and orientation controlling component concludes a height control mechanism which is configured to control the height of the camera component, to control the camera component to raise and lower on a glass curtain wall, and an orientation controlling mechanism which is configured to control the orientation of the camera component, and the height and orientation of the camera components can be controlled separately. Lightweight materials should be used for parts in height and orientation controlling components.

The memory is set as asscrolling storage: to store new video data and delete overdue video data with a storage period of three months, because of the video data stored, some of the video data is recorded at the lower frame rate of N frames/s, the time period that the memory stores video data is increased and the video data is stored for a longer time. For video data, a rolling storage period of three months is fully sufficient, for more than three months of video data is automatically deleted, and if it is necessary to copy part of the video data within three months, it can be copied from the memory in advance.

Figure 2:
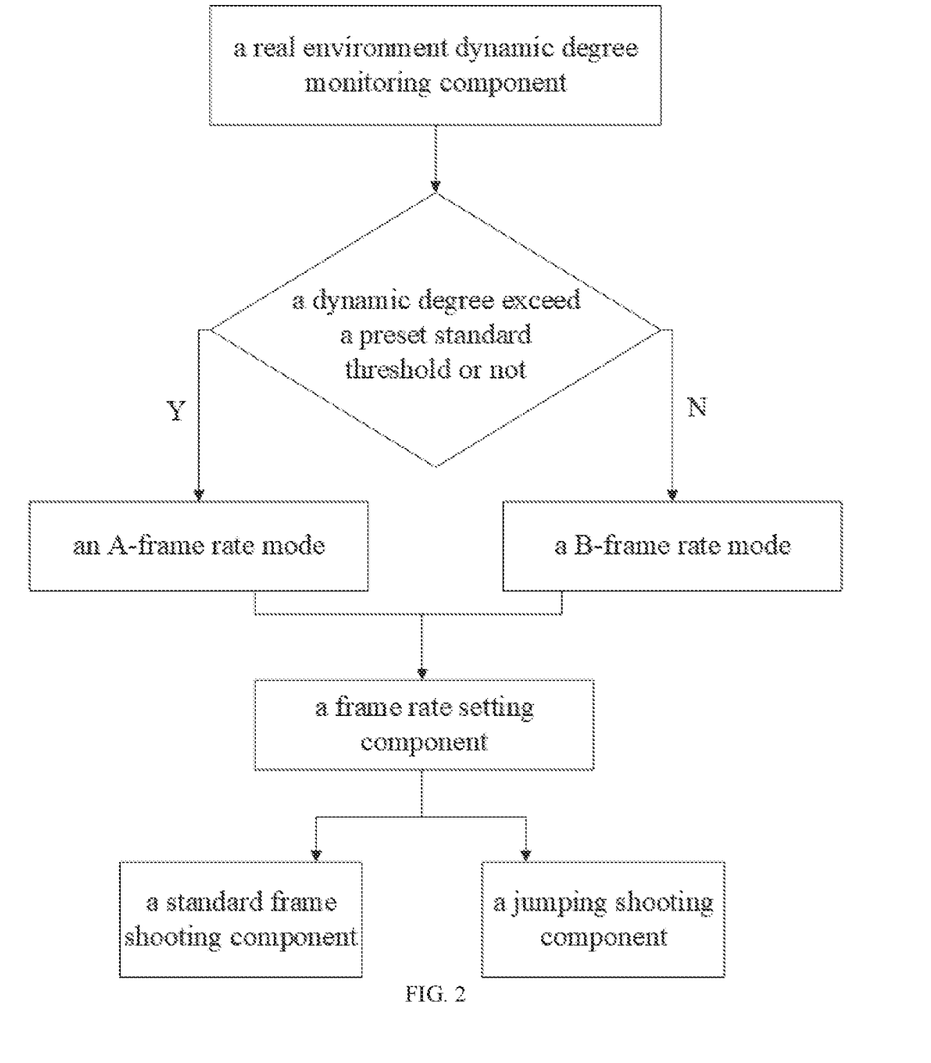
FIG. 2 is a flowchart of setting frame rate mode for an embodiment of the present disclosure.

As shown in FIG. 2, the camera assemble also includes a real environment dynamic degree monitoring component, a dynamic degree comparing component, and a frame rate setting component.

The real environment dynamic degree monitoring component is configured to identify people and vehicles, and monitor the average moving velocity of people and vehicles in a preset monitoring period, and the average moving speed is taken as the dynamic degree, that is, the value and unit of the average moving speed are corresponding to the value and unit of the dynamic degree. The preset monitoring period can be 1 s, 2 s, or 3*s*, and the real environment dynamic degree monitoring component is configured to monitor the displacement of the target object in the preset monitoring time period, and the average moving velocity is calculated by dividing the displacement by the data in the preset monitoring time period.

The dynamic degree comparing component is configured to compare a dynamic degree with a preset standard threshold, and the shooting necessity of the dynamic degree does not exceed the preset standard threshold is lower than that of the dynamic degree exceeds the preset standard threshold; when the dynamic degree exceeds the preset standard threshold, signals recorded according to an A-frame rate mode is sent to the jumping frame shooting component by the frame rate setting component, and the real pictures at the frame rate of M frames/s are recorded through the standard frame shooting component; when the dynamic degree does not exceed the preset standard threshold, the frame rate setting component sends the signals to the jumping frame shooting component recorded in a B-frame rate mode, and the real pictures at the frame rate of N frame/s are recorded through the jumping frame shooting component.

In the specific analysis, monitoring objects and the preset standard thresholds of the real environment dynamic degree monitoring component are divided into following three situations: a, b and c:

- a, when the real environment dynamic degree monitoring component monitors the people: the preset standard threshold is 5 km/h, and the average moving speed of the person during the monitoring period is monitored and preset by the real environment dynamic degree monitoring component; when the average speed of a person exceeds 5 km/h, it indicates that the person is running, that is, there may be an emergency or accidental safety incident, such as the person may steal the items of other people on the road and then run away, or it is more likely to collide with others or vehicles when running, and at this time, the necessity of collecting videos and images is high, so real picture is recorded at the frame rate of M frames/s, and the final video picture is smoother;
- b, when non-motor vehicles and non-motor vehicle drivers are monitored by the real environment dynamic degree monitoring component: the preset standard threshold is 25 km/h, and presets the average moving speed of non-motor vehicles during the monitoring period is monitored by the real environment dynamic degree monitoring component; when the average speed of a driver driving a non-motor vehicle exceeds 25 km/h, it is considered to be speeding, indicating that there may be an emergency or a high probability of traffic safety accidents, and at this time, the necessity of collecting videos and images is high, and the real pictures need to be recorded at the frame rate of M frames/s, so that the final video picture is smoother.
- c, when motor vehicles is monitored by the real environment dynamic degree monitoring component: the preset standard threshold is 50 km/h, and the average moving speed of motor vehicles during the monitoring period is monitored and preset by the real environment dynamic degree monitoring component; for high-rise buildings with glass curtain walls, they are generally built in near main roads with central lines in cities, when the average speed of motor vehicles exceeds 50 km/h, it indicates that motor vehicles are speeding, and the probability of traffic accidents is high, and at this time, the necessity of collecting videos and images is high, and the real pictures need to be recorded at the frame rate of M frames/s.

When the dynamic degree of the monitoring objects in at least one of the above three situations exceeds the preset standard threshold in a corresponding situation, the necessity of collecting videos and images is high, and the signals recorded according to the A-frame rate mode are sent from the frame rate setting component to the jumping frame shooting component, and the real pictures at the frame rate of M frames/s are recorded through the standard frame shooting component to record smoother video pictures. When none of the three situations occur that the dynamic degree of the monitoring object exceeds the preset standard threshold in the corresponding situation, it indicates that the people are not running, non-motor vehicles and motor vehicles are not speeding, and the probability of emergency and accident is small, and at this time, the necessity of collecting videos and images is low, and the signals recorded in B-frame rate mode are sent from the frame rate setting component to the jumping frame shooting component, and the real pictures at N frames/s frame rate are recorded through the jumping frame shooting component, and at this time, the real pictures can be recorded at the lower frame rate of N frames/s, saving the storage space of the memory.

Figure 4:
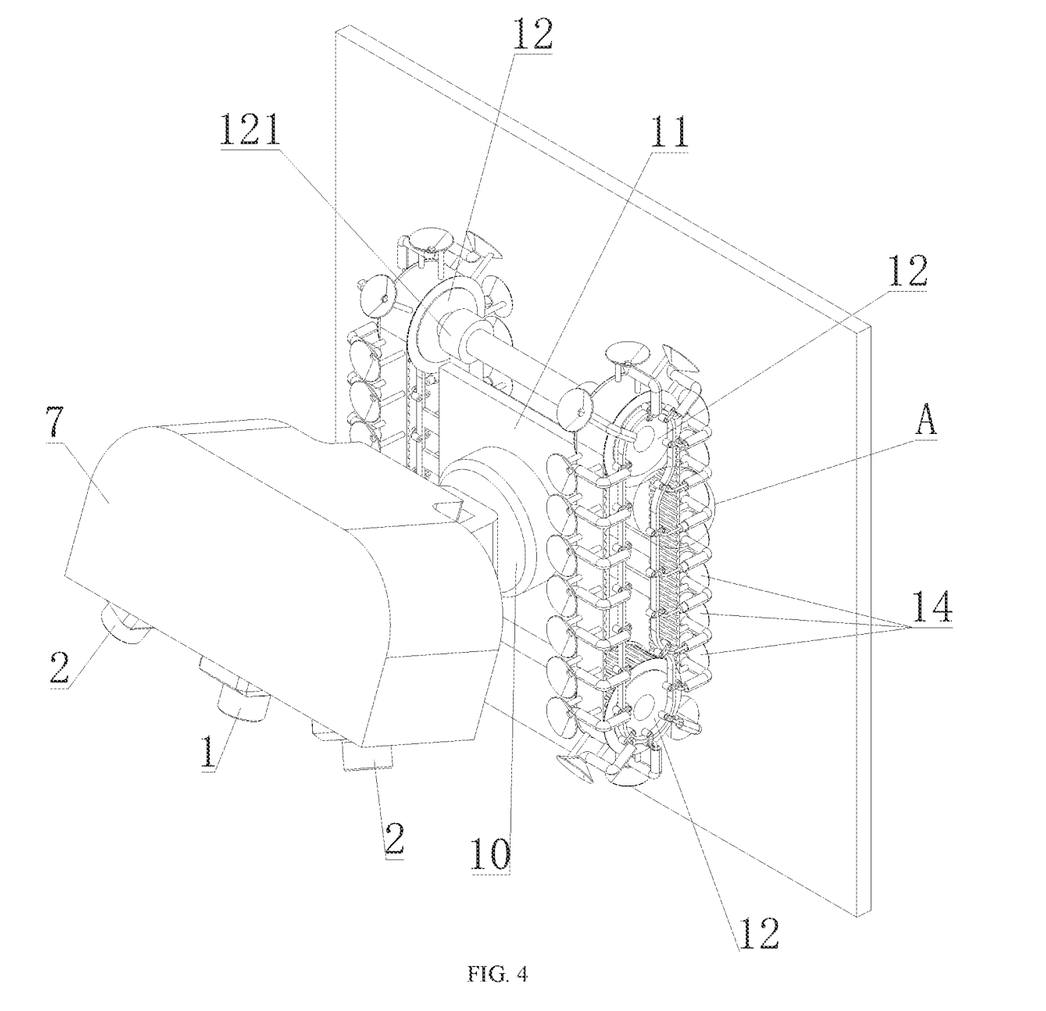
FIG. 4 is a schematic diagram of the structure of the height and orientation controlling component in an embodiment of the present disclosure.

As shown in FIG. 4, the camera includes a first camera a (1) and two second cameras b (2) symmetrically distributed on both sides of the first camera a (1), the first camera a (1) and the second camera b (2) are integrated with the standard frame shooting component, the jumping frame shooting component, the frame connecting component, the continuous frame regeneration components and the video output component. The first camera a (1) is in the middle of the three cameras to collect the real pictures, and the two second cameras b (2) on both sides are configured to collect the real pictures from other angles, and the three cameras work together to collect the real pictures within a larger angle of view, and expand the monitoring scope of the surrounding environment of high-rise buildings.

In this embodiment, the camera is used to record the real pictures at different frame rates in different situations, therefore saving storage space and extend data storage duration and improving storage space utilization. When a shooting necessity is high, the real pictures at the frame rate of M frames/s are recorded, when a shooting necessity is low, the real pictures at the lower frame rate of N frames/s are recorded. In the case of the storage space of the memory determined, the total duration of the video data that the memory is configured to store is longer, that is, the video data is stored for a longer time, and the storage space utilization of the memory is higher. For the video generated at the frame rate of M frames/s, the fluency is higher, and what is happening around the glass curtain wall of the building is more clearly shown. For the video generated at the frame rate of N frames/s, the fluency is lower, but it can still show what is happening around the glass curtain wall of the building to a certain extent, the video data is still available.

Embodiment 2, as shown in FIG. 4-FIG. 7, proposes a camera assemble that is conveniently installed on a glass curtain wall, and compared with embodiment 1, in this embodiment, the height control mechanism includes a body (11), two suction cup adsorpting lifting mechanisms are arranged side by side on the body (11), and the suction cup adsorpting lifting mechanisms are configured to climb and descend on the glass curtain wall to achieve height control, and a servo motor (121) is arranged on the body (11) and the servo motor (121) is configured to drive the suction cup adsorpting lifting mechanisms.

Figure 7:
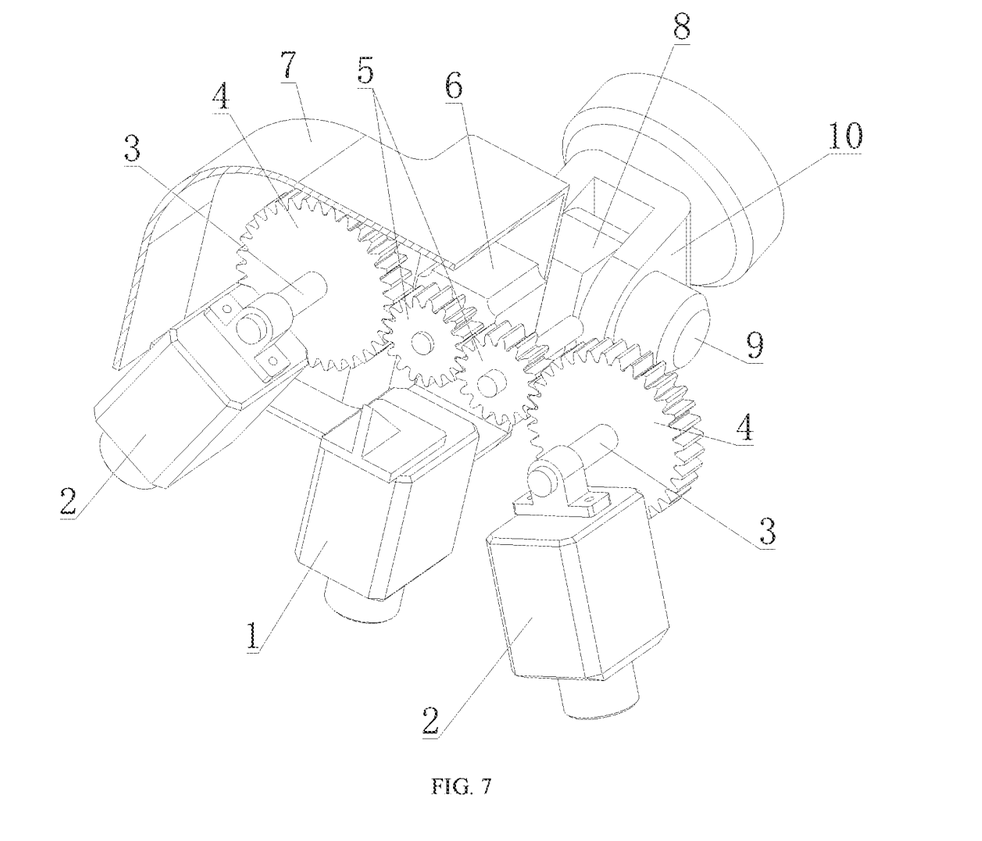
FIG. 7 is a schematic diagram of the orientation adjustment structure of the camera in an embodiment of the present disclosure.

As shown in FIG. 7, the orientation controlling mechanism includes two rotating shafts (3) for mounting the second cameras b (2);

- two driven gears (4) are respectively arranged on the two rotating shafts (3), and two driving gears (5) are respectively meshed and connected with the driven gears (4);
- the orientation controlling mechanism also includes a motor (6), and the motor (6) is configured to drive the driving gears (5) to rotate to control the second cameras b (2) to expand or retract in an inverted V shape;
- a mounting cover with a camera channel (7) is provided at a bottom end of the orientation controlling mechanism, and
- a rotating frame (8), where the rotating frame (8) is configured to arrange the mounting cover with the camera channel (7), and
- a motor (9), configured for driving the rotating frame (8) to rotate, and
- a mounting pad (10), configured for mounting the motor (9);

where, the driving gears (5) are meshed and connected with each other, and the driving gears (5) and the rotating shafts (3) are rotated and arranged on the inner side of the mounting cover (7);

the first camera a (1) is arranged on an interior of the mounting cover (7), and the mounting pad (10) is arranged on the body (11).

The output end of the motor (6) can rotate forward and reverse, and the motor (6) can drive a driving gear (5) to rotate, and the driving gear (5) drives another driving gear (5) to rotate, and the two driving gears (5) respectively drive the two driven gears (4) to rotate, and the two driven gears (4) drive the second camera b (2) to rotate through the corresponding rotating shaft (3), realizing the two second camera b (2) opposite rotation and dissociating rotation, and the motor (9) can also adjust the orientation of the first camera a (1) and the second camera b (2) by driving the rotating frame (8) to rotate, so as to adjust the first camera a (1) and the second camera b (2) monitoring angle orientation.

Figure 5:
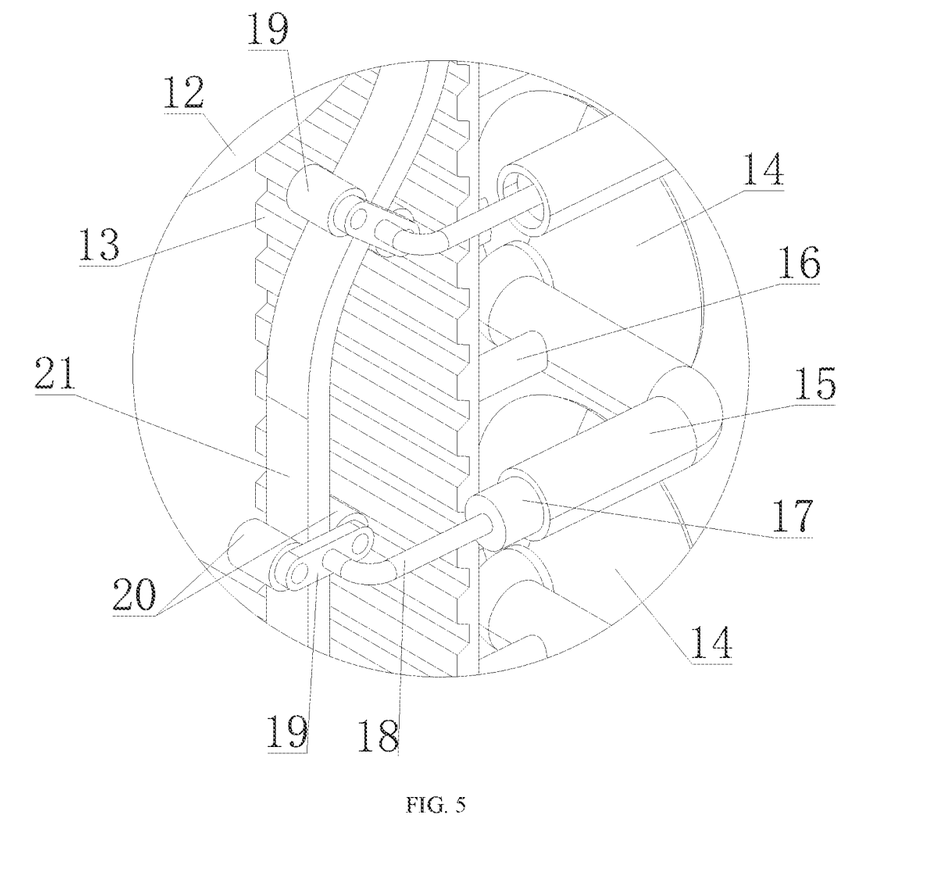
FIG. 5 is an enlarged view of the structure A in FIG. 4.

As shown in FIG. 4 and FIG. 5, the suction cup adsorpting lifting mechanism includes synchronous pulleys (12), a synchronous belt (13) and suction cups (14) and holding rods (16);

where, two synchronous pulleys (12) are rotatably arranged on the body (11), the synchronous belt (13) is nested on the two synchronous pulleys (12), a plurality of holding rods (16) are uniformly arranged on a peripheral surface of the synchronous belt (13), and the suction cups (14) are arranged on the holding rods (16) and perpendicular to the synchronous belt (13), where the synchronous pulleys (12) are driven by the servo motor (121).

The servo motor (121) is configured to drive the synchronous pulleys (12) to rotate forward and reverse, and the synchronous pulley (12) is configured to drive the synchronous belt (13) to rotate forward and reverse, and the synchronous belt (13) drives the suction cup (14) to move, and with the rolling adsorption of the suction cups (14) to the glass curtain wall to realize a climbing and a descending of the height controlling mechanism on the glass curtain wall; In the initial state, a row of suction cups (14) near the side of the glass curtain wall is pressed against the glass curtain wall, and the air on the inner side of this row of suction cups (14) is squeezed out, so that the suction cup (14) can be adsorbed on the glass curtain wall under the action of the air pressure difference between the inside and outside, when the suction cup adsorpting lifting mechanism is lifting, the rest of the suction cups (14) in the forward direction move to the glass curtain wall successively and are in the same row as a row of suction cups (14) that have been adsorbed on the glass curtain wall, and under the action of the suction cups (14) that have been adsorbed on the glass curtain wall, the suction cups (14) moving to the glass curtain wall can be pressed to the glass curtain wall through the holding rods (16), the synchronous belt (13) and the synchronous pulley (12), so as to gradually squeeze out the air inside the suction cup (14), and then the suction cup (14) can be adsorbed on the glass curtain wall. With the lifting of the suction cup adsorpting lifting mechanism, different suction cups (14) can be alternately adsorbed on the glass curtain wall, so as to adjust the monitoring height of the camera components.

Figure 6:
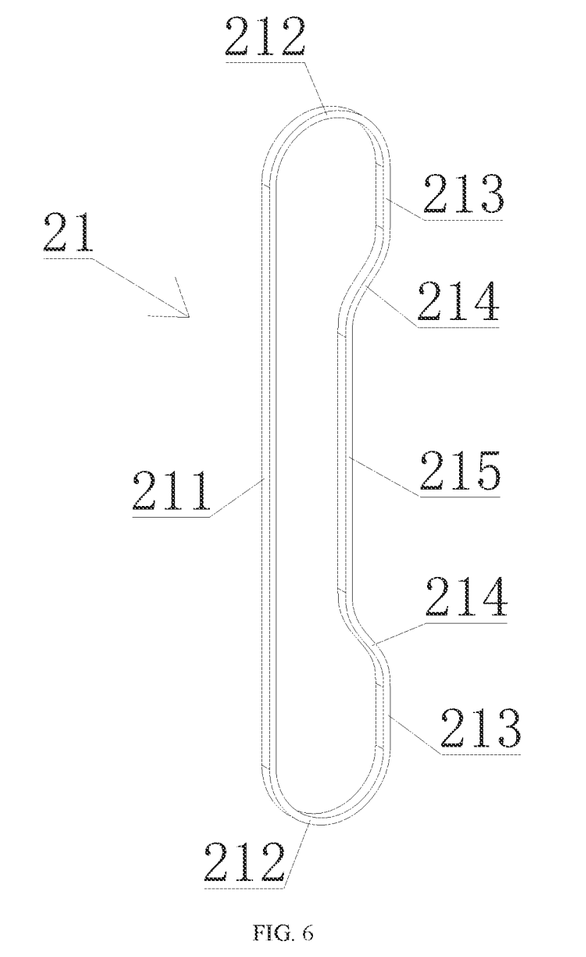
FIG. 6 is a schematic diagram of the structure of a guiding ring in an embodiment of the present disclosure.

As shown in FIG. 4-FIG. 6, the suction cup adsorpting lifting mechanism also includes a plurality of groups of air extracting components corresponding to each of the suction cups (14);

where, the air extracting components includes: a connecting pipe (15), a piston (17) and a connecting rod (18) and a rotating plate (19) and two rollers (20), where, the connecting pipe (15) is communicated with the suction cups (14), a piston (17) is solidly sealed on the connecting pipe (15), and an end of the connecting rod (18) is connected with the piston (17), and the rotating plate (19) is rotatably connected with another end of the connecting rod (18), and the rollers (20) are rotatably arranged on the rotating plate (19), and the rollers (20) are arranged side by side;

where, the body (11) is provided with a guiding ring (21), and the guiding ring (21) is located between two of the rollers (20), and the guiding ring (21) is configured to guide the rollers (20);

the guiding ring (21) includes a straight bar section a (211), an arc-shape bar section (212) and a straight bar section b (213) and a connecting bar section (214) and a straight bar section c (215);

the arc-shape bar section (212) is formed by two of semi-circles, and an end of the arc-shape bar section (212) is tangentially connected with both ends of the straight bar section a (211);

an end of the straight bar section b (213) is tangentially connected with another end of the arc-shape bar section (212);

an end of the connecting bar section (214) is tangentially connected with another end of the straight bar section b (213), and gradually bends to an S-shape toward the straight bar section a (211) along a direction away from the straight bar section b (213);

two ends of the straight bar section c (215) are tangentially connected with ends of the connecting bar sections (214) away from the straight bar section b (213), respectively;

where, the straight bar section a (211), the straight bar section b (213) and the straight bar section c (215) are distributed in parallel;

The guide ring (21) is fixed on the body (11), the multiple groups of the air extracting components are moved with the movement of the suction cups (14), when the suction cups (14) are just adsorbed on the glass curtain wall, with the rotation of the synchronous belt (13), the synchronous belt (13) drives the suction cups (14) move through the holding rods (16), and the rollers (20) in the air extracting components corresponding to the suction cups (14) are gradually rolled from the straight bar section b (213) to the straight bar section c (215) and passed by the connecting bar section (214), and the piston (17) is moved by the rollers (20) based on the rotating plate (19) and the connecting rod (18), and the piston (17) slides out of the connecting pipe (15), and a volume of a space formed between the glass curtain wall, the suction cups (14), the connecting pipe (15) and the piston (17) are enlarged, the pressure difference between an inside and an outside of the suction cups (14) is increased, and the reliability of the suction cups (14) adsorbed on the glass curtain wall is improved. When the suction cups (14) are gradually detached from the glass curtain wall, the rollers (20) in the corresponding the air extracting component roll from the straight bar section c (215) to the straight bar section b (213) passed by the connecting bar section (214), and the piston (17) slides into the connecting pipe (15) to lower the volume of the space formed between the glass curtain wall, the suction cup (14), the connecting pipe (15) and the piston (17), and to reduce the air pressure difference between the inside and outside of the suction cups (14).

To further make the suction cup (14) more smoothly absorbed on the glass curtain wall when moving, the air blowing device can be arranged on the body (11), and the air blowing device blows in the direction away from the glass curtain wall, so that the suction cup (14) in the suction cup adsorpting lifting mechanism is pressed on the glass curtain wall through the reaction force.

Embodiment 3, proposes a camera assemble that is conveniently installed on a glass curtain wall, and the difference between this embodiment and Embodiment 1 is that the frame rate is set under different circumstances without the real environment dynamic degree monitoring component, the dynamic degree comparing component, and the frame rate setting component, but is set as follows:

When the preset time period is one day, under a 24-hour timing method, from 0 o'clock to 7 o'clock, it is night time, and there are fewer people and vehicles around the building; from 7 o'clock to 24 o'clock, there are more people and vehicles around the building, and the probability of accidents is higher. Thus, a shooting necessity from 0 o'clock to 7 o'clock is lower than a shooting necessity from 7 o'clock to 24 o'clock, and the jumping frame shooting component captures real pictures from 0 o'clock to 7 o'clock at a frame rate of N frames/s, and the standard frame shooting component captures real pictures at a frame rate of M frames/s from 7 o'clock to 24 o'clock.

Embodiment 4, proposes a shooting device, including a camera assemble conveniently installed on the glass curtain wall in the above embodiment, and also including a signal transmitter electrically connected with a height and orientation controlling component and a controller connected with the signal transmitter. The staff can send signals through the controller, and adjust the height and orientation of the camera components by controlling the height and orientation controlling component through the signal transmitter, so as to realize the regulation of the monitoring height and perspective of the camera components.

The embodiments of the present disclosure are described in detail above in combination with the description of drawings, but the present disclosure is not limited to this, and various changes can also be made within the scope of knowledge possessed by technicians in the technical field, without departing from the premise of the purpose of the present disclosure.

The invention claimed is:
1. A camera assemble, wherein, comprising:
a camera,
the camera comprises a standard frame shooting component and a jumping shooting component;
where, the standard frame shooting component is configured to record real pictures in a part of an unit time in a preset time period according to a preset standard frame rate of M frames/s, and
the jump shooting component is configured to extract a number of frames from M frames at a frame rate M frames/s, and record real pictures at a frame rate of N frames/s for a rest of the unit time in the preset time period;
the camera also comprises a frame connecting component, a continuous frame regeneration component and a video output component;
where, the frame connecting component is configured to coincide a frame picture at an end of the unit of time in the preset time period with a frame picture at an initial moment of a next adjacent unit time, where, the frame connecting component is communicated with the standard frame shooting component and the jump frame shooting component; and
the continuous frame regeneration component is communicated with the frame connecting component, where, the continuous frame regeneration component is configured to select and retain a overlapped frame within a preset time period for regeneration into a continuous frame video; and
the video output component is communicated with the continuous frame regeneration component, and the video output component is configured to output video data within the preset time period;
where M and N are positive integers, and N<M, a shooting necessity at the frame rate of N frames/s of the jump shooting component is lower than a shooting necessity at the frame rate of M frames/s of the standard frame shooting component;
the camera assemble also comprises a communicating and transmitting component;
where, the communicating and transmitting component is communicated with the video output component, which is configured to transmit the video data;
the camera assemble also comprises a memory and a height and orientation controlling component;
where, the memory is wirelessly communicated with the communicating and transmitting component, and the memory is configured to receive and store the video data;
where, the height and orientation controlling component is configured to control a height of the camera component and an orientation for shooting;
the camera assemble also comprises a real environment dynamic degree monitoring component, a dynamic degree comparing component, and a frame rate setting component;
where, the real environment dynamic degree monitoring component, the dynamic degree comparing component, and a frame rate setting component connected are communicated with the camera in sequence;
the real environment dynamic degree monitoring component is configured to identify people and vehicles, and monitor the average moving velocity of people and vehicles in a preset monitoring period, and the average moving speed is taken as the dynamic degree;
the dynamic degree comparing component is configured to compare a dynamic degree with a preset standard threshold, and the shooting necessity of the dynamic degree does not exceed the preset standard threshold is lower than that of the dynamic degree exceeds the preset standard threshold;
when the dynamic degree exceeds the preset standard threshold, signals recorded according to an A-frame rate mode is sent to the jumping frame shooting component by the frame rate setting component, and the real pictures at the frame rate of M frames/s are recorded through the standard frame shooting component;
when the dynamic degree does not exceed the preset standard threshold, the frame rate setting component sends the signals to the jumping frame shooting component recorded in a B-frame rate mode, and the real pictures at the frame rate of N frame/s are recorded through the jumping frame shooting component;
monitoring objects and the preset standard thresholds of the real environment dynamic degree monitoring component are divided into following three situations:

a, when the real environment dynamic degree monitoring component monitors the people: the preset standard threshold is 5 km/h, and the average moving speed of the person during the monitoring period is monitored and preseted by the real environment dynamic degree monitoring component;

b, when non-motor vehicles and non-motor vehicle drivers are monitored by the real environment dynamic degree monitoring component: the preset standard threshold is 25 km/h, and presets the average moving speed of non-motor vehicles during the monitoring period is monitored by the real environment dynamic degree monitoring component;

c, when motor vehicles is monitored by the real environment dynamic degree monitoring component: the preset standard threshold is 50 km/h, and the average moving speed of motor vehicles during the monitoring period is monitored and preseted by the real environment dynamic degree monitoring component monitors and;

when the dynamic degree of the monitoring objects in at least one of the above three situations exceeds the preset standard threshold in a corresponding situation, the signals recorded according to the A-frame rate mode are sent from the frame rate setting component to the jumping frame shooting component, and the real pictures at the frame rate of M frames/s are recorded through the standard frame shooting component;

when none of the three situations occur that the dynamic degree of the monitoring object exceeds the preset standard threshold in the corresponding situation, the signals recorded in B-frame rate mode are sent from the frame rate setting component to the jumping frame shooting component, and the real pictures at N frames/s frame rate are recorded through the jumping frame shooting component;

where, the camera comprises a first camera and two second cameras symmetrically distributed on both sides of the first camera, the first camera and the second camera are integrated with the standard frame shooting component, the jumping frame shooting component, the frame connecting component, the continuous frame regeneration components and the video output component;

the height and orientation controlling component comprises a height control mechanism which is configured to control the height of the camera component, to control the camera component to raise and lower on a glass curtain wall, and an orientation controlling mechanism which is configured to control the orientation of the camera component;

the height control mechanism comprises a body, two suction cup adsorpting lifting mechanisms are arranged side by side on the body, and the suction cup adsorpting lifting mechanisms are configured to climb and descend on the glass curtain wall to achieve height control, and a servo motor is arranged on the body and the servo motor is configured to drive the suction cup adsorpting lifting mechanisms;

the orientation controlling mechanism comprises two rotating shafts for mounting the second cameras;

two driven gears are respectively arranged on the two rotating shafts, and two driving gears are respectively meshed and connected with the driven gears;

the orientation controlling mechanism also comprises a motor, and the motor is configured to drive the driving gears to rotate to control the second cameras to expand or retract in an inverted V shape;

a mounting cover with a camera channel is provided at a bottom end of the orientation controlling mechanism, and a rotating frame, where the rotating frame is configured to arrange the mounting cover with the camera channel, and a motor, configured for driving the rotating frame to rotate, and a mounting pad, configured for mounting the motor;

where, the driving gears are meshed and connected with each other, and the driving gears and the rotating shafts are rotated and arranged on the inner side of the mounting cover;

the first camera is arranged on an interior of the mounting cover, and the mounting pad is arranged on the body;

the suction cup adsorpting lifting mechanism comprises synchronous pulleys, a synchronous belt and suction cups and holding rods;

where, two synchronous pulleys are rotatably arranged on the body, the synchronous belt is nested on the two synchronous pulleys, a plurality of holding rods are uniformly arranged on a peripheral surface of the synchronous belt, and the suction cups are arranged on the holding rods and perpendicular to the synchronous belt, where the synchronous pulleys are driven by the servo motor;

the servo motor is configured to drive the synchronous pulleys to rotate forward and reverse, and the synchronous pulley is configured to drive the synchronous belt to rotate forward and reverse, and the synchronous belt drives the suction cup to move, and with the rolling adsorption of the suction cups to the glass curtain wall to realize a climbing and a descending of the height controlling mechanism on the glass curtain wall;

the suction cup adsorpting lifting mechanism also comprises a plurality of groups of air extracting components corresponding to each of the suction cups;

where, the air extracting components comprises: a connecting pipe, a piston and a connecting rod and a rotating plate and two rollers, where, the connecting pipe is communicated with the suction cups, a piston is solidly sealed on the connecting pipe, and an end of the connecting rod is connected with the piston, and the rotating plate is rotatably connected with another end of the connecting rod, and the rollers are rotatably arranged on the rotating plate, and the rollers are arranged side by side;

where, the body is provided with a guiding ring, and the guiding ring is located between two of the rollers, and the guiding ring is configured to guide the rollers;

the guiding ring comprises a straight bar section, an arc-shape bar section and a straight bar section a and a connecting bar section b and a straight bar section c;

the arc-shape bar section is formed by two of semi-circles, and an end of the arc-shape bar section is tangentially connected with both ends of the straight bar section a;

an end of the straight bar section b is tangentially connected with another end of the arc-shape bar section;

an end of the connecting bar section is tangentially connected with another end of the straight bar section b, and gradually bends to an S-shape toward the straight bar section a along a direction away from the straight bar section b;

two ends of the straight bar section c are tangentially connected with ends of the connecting bar sections away from the straight bar section b, respectively;

where, the straight bar section a, the straight bar section b and the straight bar section c are distributed in parallel;

the multiple groups of the air extracting components are moved with the movement of the suction cups, when the suction cups are just adsorbed on the glass curtain wall, with the rotation of the synchronous belt, the synchronous belt drives the suction cups move through the holding rods; and the rollers in the air extracting components corresponding to the suction cups are gradually rolled from the straight bar section b to the straight bar section c and passed by the connecting bar section; and the piston is moved by the rollers based on the rotating plate and the connecting rod, and the piston slides out of the connecting pipe, and a volume of a space formed between the glass curtain wall, the suction cups, the connecting pipe and the piston are enlarged, the pressure difference between an inside and an outside of the suction cups is increased, and the reliability of the suction cups adsorbed on the glass curtain wall is improved;

when the suction cups are gradually detached from the glass curtain wall, the rollers in the corresponding the air extracting component roll from the straight bar section c to the straight bar section b passed by the connecting bar section, and the piston slides into the connecting pipe to lower the volume of the space formed between the glass curtain wall, the suction cup, the connecting pipe and the piston, and to reduce the air pressure difference between the inside and outside of the suction cups.

2. The camera assemble according to claim 1, wherein, the memory is set as asscrolling storage: to store new video data and delete overdue video data with a storage period of three months.

3. The camera assemble according to claim 1, wherein, when the preset time period is one day, under a 24-hour timing method, a shooting necessity from 0 o'clock to 7 o'clock is lower than a shooting necessity from 7 o'clock to 24 o'clock;

the jumping frame shooting component captures real pictures from 0 o'clock to 7 o'clock at a frame rate of N frames/s, and the standard frame shooting component captures real pictures at a frame rate of M frames/s from 7 o'clock to 24 o'clock.

4. A shooting device, wherein, comprising a camera assemble, a signal transmitter and a controller, the controller is connected with the signal transmitter, and the signal transmitter is electrically connected with a height and orientation controlling component;

where, the camera assemble comprises:
a camera,
the camera comprises a standard frame shooting component and a jumping shooting component;

where, the standard frame shooting component is configured to record real pictures in a part of an unit time in a preset time period according to a preset standard frame rate of M frames/s, and the jump shooting component is configured to extract a number of frames from M frames at a frame rate M frames/s, and record real pictures at a frame rate of N frames/s for a rest of the unit time in the preset time period;

the camera also comprises a frame connecting component, a continuous frame regeneration component and a video output component;

where, the frame connecting component is configured to coincide a frame picture at an end of the unit of time in the preset time period with a frame picture at an initial moment of a next adjacent unit time, where, the frame connecting component is communicated with the standard frame shooting component and the jump frame shooting component; and the continuous frame regeneration component is communicated with the frame connecting component, where, the continuous frame regeneration component is configured to select and retain a overlapped frame within a preset time period for regeneration into a continuous frame video; and the video output component is communicated with the continuous frame regeneration component, and the video output component is configured to output video data within the preset time period;

where M and N are positive integers, and N<M, a shooting necessity at the frame rate of N frames/s of the jump shooting component is lower than a shooting necessity at the frame rate of M frames/s of the standard frame shooting component;

the camera assemble also comprises a communicating and transmitting component;

where, the communicating and transmitting component is communicated with the video output component, which is configured to transmit the video data;

the camera assemble also comprises a memory and a height and orientation controlling component;

where, the memory is wirelessly communicated with the communicating and transmitting component, and the memory is configured to receive and store the video data;

where, the height and orientation controlling component is configured to control a height of the camera component and an orientation for shooting;

the camera assemble also comprises a real environment dynamic degree monitoring component, a dynamic degree comparing component, and a frame rate setting component;

where, the real environment dynamic degree monitoring component, the dynamic degree comparing component, and a frame rate setting component connected are communicated with the camera in sequence;

the real environment dynamic degree monitoring component is configured to identify people and vehicles, and monitor the average moving velocity of people and vehicles in a preset monitoring period, and the average moving speed is taken as the dynamic degree;

the dynamic degree comparing component is configured to compare a dynamic degree with a preset standard threshold, and the shooting necessity of the dynamic degree does not exceed the preset standard threshold is lower than that of the dynamic degree exceeds the preset standard threshold;

when the dynamic degree exceeds the preset standard threshold, signals recorded according to an A-frame rate mode is sent to the jumping frame shooting component by the frame rate setting component, and the real pictures at the frame rate of M frames/s are recorded through the standard frame shooting component;

when the dynamic degree does not exceed the preset standard threshold, the frame rate setting component sends the signals to the jumping frame shooting component recorded in a B-frame rate mode, and the real pictures at the frame rate of N frame/s are recorded through the jumping frame shooting component;

monitoring objects and the preset standard thresholds of the real environment dynamic degree monitoring component are divided into following three situations:

a, when the real environment dynamic degree monitoring component monitors the people: the preset standard threshold is 5 km/h, and the average moving speed of the person during the monitoring period is monitored and preseted by the real environment dynamic degree monitoring component;

b, when non-motor vehicles and non-motor vehicle drivers are monitored by the real environment dynamic degree monitoring component: the preset standard threshold is 25 km/h, and presets the average moving speed of non-motor vehicles during the monitoring period is monitored by the real environment dynamic degree monitoring component;

c, when motor vehicles is monitored by the real environment dynamic degree monitoring component: the preset standard threshold is 50 km/h, and the average moving speed of motor vehicles during the monitoring period is monitored and preseted by the real environment dynamic degree monitoring component monitors and;

when the dynamic degree of the monitoring objects in at least one of the above three situations exceeds the preset standard threshold in a corresponding situation, the signals recorded according to the A-frame rate mode are sent from the frame rate setting component to the jumping frame shooting component, and the real pictures at the frame rate of M frames/s are recorded through the standard frame shooting component;

when none of the three situations occur that the dynamic degree of the monitoring object exceeds the preset standard threshold in the corresponding situation, the signals recorded in B-frame rate mode are sent from the frame rate setting component to the jumping frame shooting component, and the real pictures at N frames/s frame rate are recorded through the jumping frame shooting component;

where, the camera comprises a first camera and two second cameras symmetrically distributed on both sides of the first camera, the first camera and the second camera are integrated with the standard frame shooting component, the jumping frame shooting component, the frame connecting component, the continuous frame regeneration components and the video output component;

the height and orientation controlling component comprises a height control mechanism which is configured to control the height of the camera component, to control the camera component to raise and lower on a glass curtain wall, and an orientation controlling mechanism which is configured to control the orientation of the camera component;

the height control mechanism comprises a body, two suction cup adsorpting lifting mechanisms are arranged side by side on the body, and the suction cup adsorpting lifting mechanisms are configured to climb and descend on the glass curtain wall to achieve height control, and a servo motor is arranged on the body and the servo motor is configured to drive the suction cup adsorpting lifting mechanisms;

the orientation controlling mechanism comprises two rotating shafts for mounting the second cameras;

two driven gears are respectively arranged on the two rotating shafts, and two driving gears are respectively meshed and connected with the driven gears;

the orientation controlling mechanism also comprises a motor, and the motor is configured to drive the driving gears to rotate to control the second cameras to expand or retract in an inverted V shape;

a mounting cover with a camera channel is provided at a bottom end of the orientation controlling mechanism, and a rotating frame, where the rotating frame is configured to arrange the mounting cover with the camera channel, and a motor, configured for driving the rotating frame to rotate, and a mounting pad, configured for mounting the motor;

where, the driving gears are meshed and connected with each other, and the driving gears and the rotating shafts are rotated and arranged on the inner side of the mounting cover;

the first camera is arranged on an interior of the mounting cover, and the mounting pad is arranged on the body;

the suction cup adsorpting lifting mechanism comprises synchronous pulleys, a synchronous belt and suction cups and holding rods;

where, two synchronous pulleys are rotatably arranged on the body, the synchronous belt is nested on the two synchronous pulleys, a plurality of holding rods are uniformly arranged on a peripheral surface of the synchronous belt, and the suction cups are arranged on the holding rods and perpendicular to the synchronous belt, where the synchronous pulleys are driven by the servo motor;

the servo motor is configured to drive the synchronous pulleys to rotate forward and reverse, and the synchronous pulley is configured to drive the synchronous belt to rotate forward and reverse, and the synchronous belt drives the suction cup to move, and with the rolling adsorption of the suction cups to the glass curtain wall to realize a climbing and a descending of the height controlling mechanism on the glass curtain wall;

the suction cup adsorpting lifting mechanism also comprises a plurality of groups of air extracting components corresponding to each of the suction cups;

where, the air extracting components comprises: a connecting pipe, a piston and a connecting rod and a rotating plate and two rollers, where, the connecting pipe is communicated with the suction cups, a piston is solidly sealed on the connecting pipe, and an end of the connecting rod is connected with the piston, and the rotating plate is rotatably connected with another end of the connecting rod, and the rollers are rotatably arranged on the rotating plate, and the rollers are arranged side by side;

where, the body is provided with a guiding ring, and the guiding ring is located between two of the rollers, and the guiding ring is configured to guide the rollers;

the guiding ring comprises a straight bar section, an arc-shape bar section and a straight bar section a and a connecting bar section b and a straight bar section c;

the arc-shape bar section is formed by two of semi-circles, and an end of the arc-shape bar section is tangentially connected with both ends of the straight bar section a;

an end of the straight bar section b is tangentially connected with another end of the arc-shape bar section;

an end of the connecting bar section is tangentially connected with another end of the straight bar section b, and gradually bends to an S-shape toward the straight bar section a along a direction away from the straight bar section b;

two ends of the straight bar section c are tangentially connected with ends of the connecting bar sections away from the straight bar section b, respectively;

where, the straight bar section a, the straight bar section b and the straight bar section c are distributed in parallel;

the multiple groups of the air extracting components are moved with the movement of the suction cups, when the suction cups are just adsorbed on the glass curtain wall, with the rotation of the synchronous belt, the synchronous belt drives the suction cups move through the holding rods; and the rollers in the air extracting components corresponding to the suction cups are gradually rolled from the straight bar section b to the straight bar section c and passed by the connecting bar section; and the piston is moved by the rollers based on the rotating plate and the connecting rod, and the piston slides out of the connecting pipe, and a volume of a space formed between the glass curtain wall, the suction cups, the connecting pipe and the piston are enlarged, the pressure difference between an inside and an outside of the suction cups is increased, and the reliability of the suction cups adsorbed on the glass curtain wall is improved;

when the suction cups are gradually detached from the glass curtain wall, the rollers in the corresponding the air extracting component roll from the straight bar section c to the straight bar section b passed by the connecting bar section, and the piston slides into the connecting pipe to lower the volume of the space formed between the glass curtain wall, the suction cup, the connecting pipe and the piston, and to reduce the air pressure difference between the inside and outside of the suction cups.

* * * * *